US011838456B2

United States Patent
Toda et al.

(10) Patent No.: US 11,838,456 B2
(45) Date of Patent: Dec. 5, 2023

(54) INFORMATION PROCESSING APPARATUS FOR CAUSING AN IMAGE FORMING APPARATUS TO PRINT IN ACCORDANCE WITH A POST WRITTEN IN A CHAT

(71) Applicant: FUJIFILM BUSINESS INNOVATION CORP., Tokyo (JP)

(72) Inventors: Tsuyoshi Toda, Kanagawa (JP); Takafumi Haruta, Kanagawa (JP); Izumi Nakano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 710 days.

(21) Appl. No.: 16/843,002

(22) Filed: Apr. 8, 2020

(65) Prior Publication Data

US 2021/0144264 A1    May 13, 2021

(30) Foreign Application Priority Data

Nov. 8, 2019   (JP) ................................ 2019-202907

(51) Int. Cl.
| | | |
|---|---|---|
| *H04N 1/00* | (2006.01) | |
| *H04L 51/046* | (2022.01) | |
| *H04L 51/216* | (2022.01) | |
| *H04L 51/224* | (2022.01) | |

(52) U.S. Cl.
CPC ....... *H04N 1/00209* (2013.01); *H04L 51/046* (2013.01); *H04L 51/216* (2022.05); *H04L 51/224* (2022.05)

(58) Field of Classification Search
CPC ................................................. H04N 1/00209
See application file for complete search history.

(56) References Cited

U.S. PATENT DOCUMENTS

| | | | |
|---|---|---|---|
| 9,325,651 B2 | 4/2016 | Sakuta et al. | |
| 9,621,492 B2 | 4/2017 | Park et al. | |
| 2008/0294720 A1* | 11/2008 | Facemire | ............ H04L 12/1827 709/204 |

(Continued)

FOREIGN PATENT DOCUMENTS

| | | |
|---|---|---|
| JP | 2014-164522 A | 9/2014 |
| JP | 2014-225268 A | 12/2014 |

OTHER PUBLICATIONS

Sep. 12, 2023 Office Action issued in Japanese Patent Application No. 2019-202907.

*Primary Examiner* — Benjamin O Dulaney
(74) *Attorney, Agent, or Firm* — Oliff PLC

(57) ABSTRACT

An information processing apparatus including processor configured to cause a user participates in a first chat room, wherein an image forming apparatus performs a process with a post written by user and opens for a specific site, an image forming apparatus associated with the first chat room or with an existing user who has participated in first chat room to perform a process according to a post written by user who has participated in first chat room and cause, if user participates in second chat room, in which an image forming apparatus performs a process in accordance with a post written by user and has not been opened for a specific site, an image forming apparatus associated with second chat room or an image forming apparatus associated with existing user who has participated in second chat room not to perform a process according to a post written by user.

18 Claims, 13 Drawing Sheets

(56) References Cited

U.S. PATENT DOCUMENTS

2016/0043975 A1    2/2016  Park et al.
2017/0041263 A1*  2/2017  Shekel .................... H04L 51/04
2021/0055897 A1*  2/2021  Tomihisa ................ H04L 51/10

* cited by examiner

USER A'S PRINTER REGISTRATION INFORMATION LIST
REGISTRATION INFORMATION (CHAT ROOM 1)
REGISTRATION INFORMATION (CHAT ROOM 2: USER B)
REGISTRATION INFORMATION (CHAT ROOM 2: USER C)

CHAT ROOM 2 (OSAKA)

INFORMATION PROCESSING APPARATUS FOR CAUSING AN IMAGE FORMING APPARATUS TO PRINT IN ACCORDANCE WITH A POST WRITTEN IN A CHAT

CROSS-REFERENCE TO RELATED APPLICATIONS

This application is based on and claims priority under 35 USC 119 from Japanese Patent Application No. 2019-202907 filed Nov. 8, 2019.

BACKGROUND

(i) Technical Field

The present disclosure relates to an information processing apparatus and a non-transitory computer readable medium.

(ii) Related Art

Japanese Unexamined Patent Application Publication No. 2014-164522 proposes a message notification apparatus relating to a communication service that displays, in chronological order, messages written by members. More specifically, the message notification apparatus detects an operation instruction for operating an external apparatus from a message written in the communication service that displays, in chronological order, messages written by the members and identifies a member who has written the message as a person who has given the operation instruction. The message notification apparatus also controls the external apparatus in accordance with the operation instruction, obtains a result of an operation performed by the external apparatus in accordance with the operation instruction, and generates a report message indicating the obtained result of the operation. The message notification apparatus then outputs the generated report message to a server that provides the communication service and causes the communication service to display the generated report message while specifying the person who has given the operation instruction as a destination.

Japanese Unexamined Patent Application Publication No. 2014-225268 discloses an information provision system that executes a method for providing information through an instant messaging application. More specifically, the information provision system receives, through a messaging application installed on a user terminal, a message to be transmitted to a software robot from a user. The information provision system then retrieves a reply from a database using the message as a query and transmits the reply to the user through the messaging application installed on the user terminal.

SUMMARY

Some chat rooms are opened for specific sites, and other chat rooms are not opened for specific sites. In the case of a chat room opened for a specific site, an image forming apparatus associated with a user might perform a process. In addition, in the case of a chat room opened for a specific site, an image forming apparatus according to the site might be associated with the chat room because an image forming apparatus used is different between sites. A chat room opened for a specific site is opened while assuming that an image forming apparatus provided at the site will be used by users in the chat room. A chat room that is not opened for a specific site is opened while assuming, for example, that an image forming apparatus provided at the site will not perform a process. If the same process is uniformly performed in accordance with a post written in a chat room regardless of whether the chat room has been opened for a specific site or not opened for a specific site, a registered image forming apparatus might undesirably perform a process in a chat room opened for a specific site without taking into consideration the site or an image forming apparatus according to the site might undesirably perform a process in the chat room that is not opened for a specific site.

Aspects of non-limiting embodiments of the present disclosure relate to an information processing apparatus and a non-transitory computer readable medium that, if a user participates in a chat room opened for a specific site, causes an image forming apparatus according to the chat room to perform a process and, if the user participates in a chat room that has not been opened for a specific site, cause an image forming apparatus associated with a site or an image forming apparatus associated with a user who has participated in the chat room not to perform a process, unlike when a registered image forming apparatus uniformly performs a process in accordance with a post written in a chat room regardless of whether the chat room has been opened for a specific site.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to cause, if a user participates in a first chat room, in which an image forming apparatus performs a process in accordance with a post written by the user and which has been opened for a specific site, an image forming apparatus associated with the first chat room or an image forming apparatus associated with an existing user who has already participated in the first chat room to perform a process according to a post written by the user who has participated in the first chat room and prevent, if the user participates in a second chat room, in which an image forming apparatus performs a process in accordance with a post written by the user and which has not been opened for a specific site, an image forming apparatus associated with the second chat room or an image forming apparatus associated with an existing user who has already participated in the second chat room from performing a process according to a post written by the user.

BRIEF DESCRIPTION OF THE DRAWINGS

An exemplary embodiment of the present disclosure will be described in detail based on the following figures, wherein.

DETAILED DESCRIPTION

Figure 1:
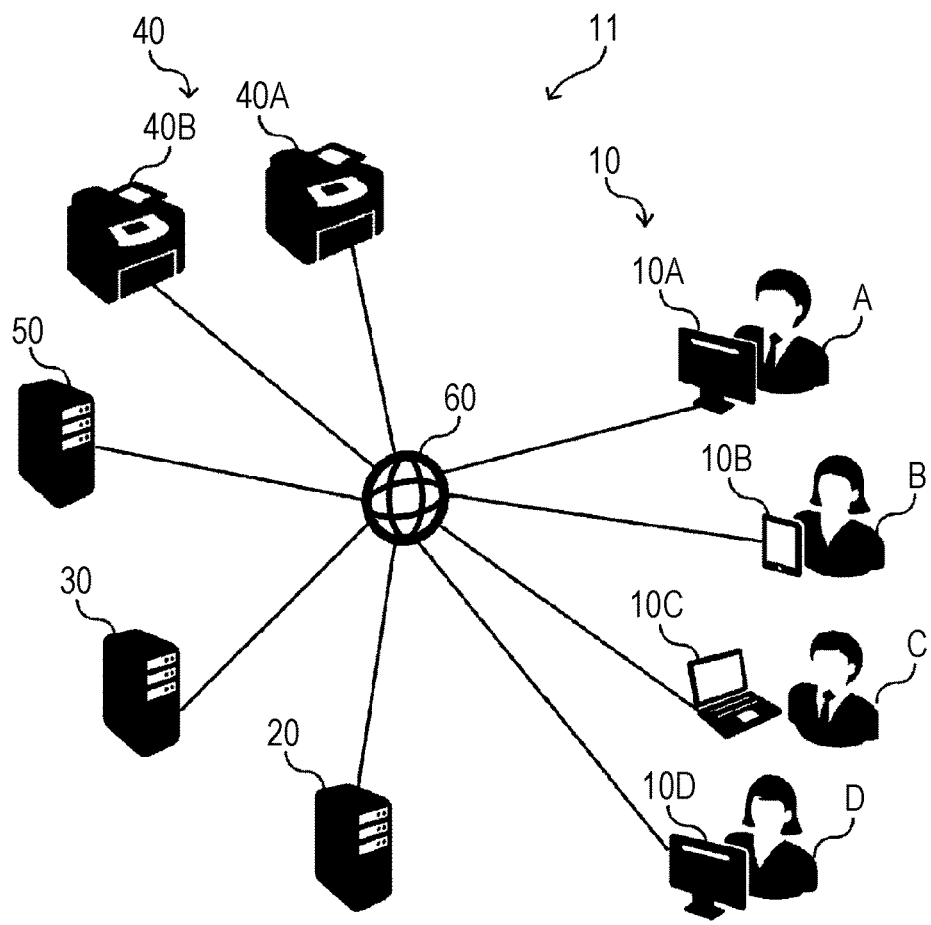
FIG. 1 is a diagram illustrating a schematic configuration of a control system according to an exemplary embodiment.

An exemplary embodiment of the present disclosure will be described in detail hereinafter with reference to the drawings. In the drawings, the same or equivalent components or parts are given the same reference numerals. Dimensions and ratios in the drawings are exaggerated for convenience of description and might be different from actual dimensions and ratios. FIG. 1 is a diagram illustrating a schematic configuration of a control system according to the present exemplary embodiment.

A control system 11 includes user terminals 10, a chat room server 20, a chatbot server 30 as an information processing apparatus, image forming apparatuses 40, and a document server 50. The user terminals 10, the chat room server 20, the chatbot server 30, the image forming apparatuses 40, and the document server 50 are connected to one another by a communication network 60 such as the Internet.

The user terminals 10 are terminals used by users and may be any kind of terminals such as desktop computers, laptop computers, tablet computers, or smartphones. The term "users" refers to users of the terminals. In FIG. 1, users A to D use user terminals 10A to 10D, respectively. The user terminals 10A to 10D will be generically referred to as "user terminals 10".

The chat room server 20 provides a chat room as a service. A chat room is a virtual space where users and a chatbot, which will be described later, can share messages and files (e.g., electronic files such as image files and document files) through chats. Here, a "chat" refers to a conversation held on a computer network between plural participants in real-time. The participants include users who are associated with real persons and software robots that operate in accordance with certain rules. A chatbot is a software robot that achieves a certain process on the basis of information posted by a user in a chat room. One or plural users may participate in a chat room.

The users can post messages or have conversations in a chat room using the user terminals 10. In a chat room, the users can share messages, and the chatbot can respond to messages posted by the users. In addition, in a chat room, the users can give, to the chatbot, instructions for causing the image forming apparatuses 40 to perform certain processes. The chatbot extracts instructions included in messages through natural language processing and causes the image forming apparatuses 40 to perform certain processes. One or plural users can participate in a chat room and have a conversation with the chatbot. Any number of chat rooms can be generated.

In the present exemplary embodiment, the chat room server 20 provides at least two types of chat room. One is a chat room opened for a specific site, which is an example of a first chat room in the present disclosure. The other is a chat room that is not opened for a specific site, which is an example of a second chat room in the present disclosure. A "site" refers to a place where a user's activity occurs. In the case of a company whose head office is located in Tokyo and whose branch office is located in Osaka, for example, the offices in Tokyo and Osaka can be sites. In addition, in the case of an event held in Tokyo and Osaka, chat rooms might be opened for visitors at a Tokyo venue and visitors at an Osaka venue. A chat room opened for a specific site may be any chat room opened for a single site. Each user need not belong to a single site but may belong to plural sites. A chat room that is not opened for a specific site, on the other hand, is a chat room that has not been opened in consideration of a site. A chat room that is not opened for a specific site may be, for example, a chat room opened by users who have a hobby in common in order to share information regarding the hobby or a chat room opened in order to check attendance for an alumni reunion. Chat rooms opened for specific sites and chat rooms that are not opened for specific sites need not have related purposes of opening. One of use cases assumed in the present exemplary embodiment is a case where plural users at different sites develop a project by participating in chat rooms at their respective sites. It is assumed in this case that a chat room opened for the whole project is a chat room that is not opened for a specific site and each of the chat rooms opened at the different sites is a chat room complementarily opened for a specific site. In the following description, the chat room opened for the whole project, which is a chat room that is not opened for a specific site, will be described as an example of a public chat room. In addition, in the following description, the chat rooms opened at the different sites, such as a Tokyo office and an Osaka office, will be described as examples of a private chat room. The private chat rooms may be chat rooms for which the number of participants is smaller than for the public chat room or chat rooms in which privacy is protected more carefully than in the public chat room. The private chat rooms, however, may be any kind of chat rooms.

The chatbot server 30 manages the chatbot. As described above, the chatbot participates in chatrooms. The chatbot responds to the users' messages and causes the image forming apparatuses 40 to perform certain processes in accordance with instructions included in the messages.

If a message regarding an instruction to cause an image forming apparatus 40 to perform a certain process is posted in a chatroom in which the chatbot has participated, the chatbot causes an image forming apparatus 40 associated with a user who has participated in the chat room to perform the certain process. When a user and an image forming apparatus are associated with each other, the user and the image forming apparatus are registered while being associated with each other. Processes performed by the image forming apparatuses 40 include, for example, a process for performing printing, which is an example of outputting of a file such as a document file or an image file, a process for editing a file, a process for generating or processing information using a component of an image forming apparatus 40, and a process for communicating information with another apparatus. The outputting of a file is not limited to printing, and also includes conversion of a file format. An instruction to cause an image forming apparatus 40 to perform printing can be not only an instruction to directly cause the image forming apparatus 40 to perform printing but also provision of information necessary to generate a print job, such as an image file to be printed or specifications of printing, in a chat room.

A user who newly participates, from outside a site, in a private chat room opened for the specific site, which has been described above, does not know which image forming apparatus 40 is associated with the private chat room or existing users who have already participated in the private chat room. The existing users are users who have participated in the chat room before the new user participates in the chat room and who are recognized as participants of the chat room, which include not only users who have posted messages but also users who have been invited to the chat room. The user who participates in the chat room from outside the site can be a user who has participated in a private chat room other than the foregoing private chat room or a user who has not participated in any chat room opened for a specific site. It is assumed, for example, that the user A, who usually works in Tokyo, makes a business trip to an Osaka site. The user A does not know what kind of image forming apparatus 40 is associated with a private chat room opened at the Osaka site or existing users who have already participated in the private chat room. It is cumbersome to ask a user who is going to participate in a private chat room opened for a specific site but who is usually at a place outside the site to make settings for using an image forming apparatus 40 available in the private chat room.

The chatbot server 30 according to the present exemplary embodiment performs control such that a user who participates, from outside a site, in a private chat room opened for the specific site can use an image forming apparatus 40 associated with the private chat room or an existing user who has already participated in the private chat room. As a result of the control, the chatbot server 30 according to the present exemplary embodiment makes the image forming apparatus 40 associated with the private chat room or the existing user who has already participated in the private chat room available to the user who participates, from outside the site, in the private chat room without necessitating the user to perform an operation for obtaining information regarding an image forming apparatus suitable for the site and making settings for using the image forming apparatus.

The image forming apparatuses 40 may be any kind of apparatuses, such as printers or multifunction peripherals (MFPs) that form images on a recording medium such as sheets of paper on the basis of print jobs. In the example of the control system 11 illustrated in FIG. 1, the chatbot server 30 manages image forming apparatuses 40A and 40B. The image forming apparatuses 40A and 40B will be generically referred to as "image forming apparatuses 40". In the example illustrated in FIG. 1, the image forming apparatuses 40 are connected to the chatbot server 30 over the communication network 60, but the image forming apparatuses 40 may be directly connected to the chatbot server 30.

The document server 50 stores files, such as document files and image files, to be printed by the image forming apparatuses 40. The files stored in the document server 50 can be viewed and edited in accordance with instructions from the chatbot server 30 or the user terminals 10. The chat room server 20 or the chatbot server 30 may have the function of the document server 50, instead.

Next, the hardware configuration of the chat room server 20, the chatbot server 30, and the document server 50 will be described.

Figure 2:
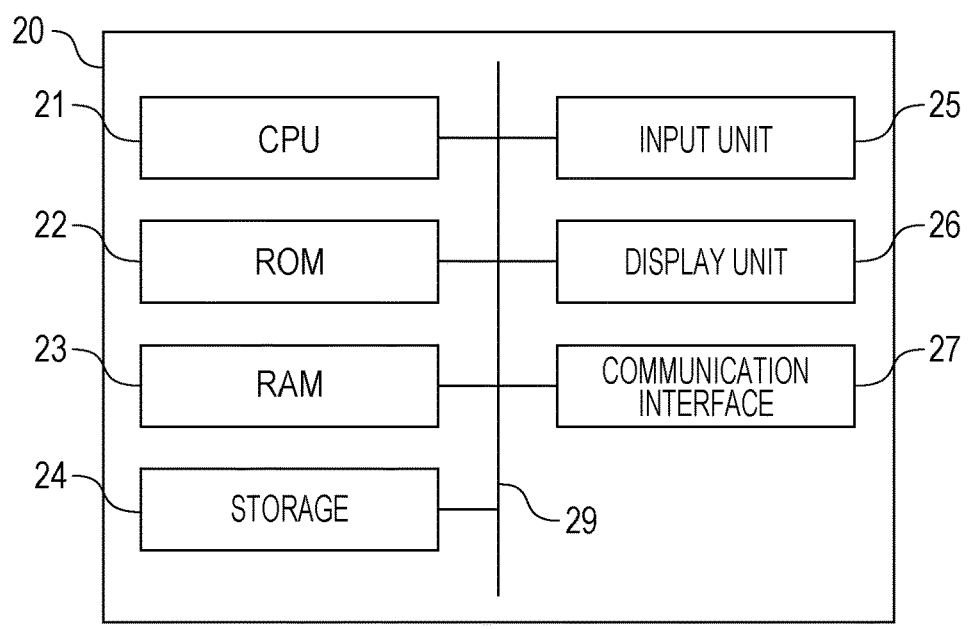
FIG. 2 is a block diagram illustrating the hardware configuration of a chat room server.

First, the hardware configuration of the chat room server 20 will be described. FIG. 2 is a block diagram illustrating the hardware configuration of the chat room server 20.

As illustrated in FIG. 2, the chat room server 20 includes a central processing unit (CPU) 21, a read-only memory (ROM) 22, a random-access memory (RAM) 23, a storage 24, an input unit 25, a display unit 26, and a communication interface 27. These components are communicably connected to one another through a bus 29.

The CPU 21 executes various programs and controls the other components. That is, the CPU 21 reads a program from the ROM 22 or the storage 24 and executes the program using the RAM 23 as a working area. The CPU 21 controls the other components or performs various types of processing in accordance with the programs stored in the ROM 22 or the storage 24. In the present exemplary embodiment, the ROM 22 or the storage 24 stores a program for providing a chat room.

The ROM 22 stores various programs and various pieces of information. The RAM 23 temporarily stores a program or information as a working area. The storage 24 is achieved by a storage medium such as a hard disk drive (HDD) or a solid-state drive (SSD) and stores various programs including an operating system (OS) and various pieces of information.

The input unit 25 includes a pointing device such as a mouse and a keyboard and is used to make various inputs. The display unit 26 is a liquid crystal display or an organic electroluminescent (EL) display, for example, and displays various pieces of information. The display unit 26 may employ a touch panel system and also serve as the input unit 25. The communication interface 27 is used to communicate with other apparatuses over the communication network 60. A standard such as Ethernet, fiber distributed data interface (FDDI), or Wi-Fi (registered trademark) is used.

Figure 3:
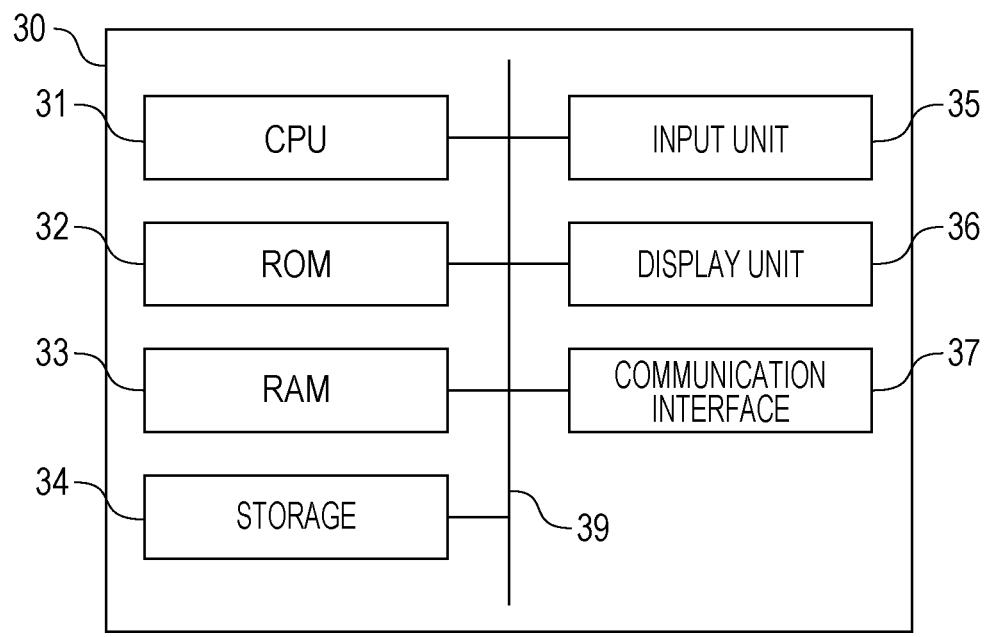
FIG. 3 is a block diagram illustrating the hardware configuration of a chatbot server.

Next, the hardware configuration of the chatbot server 30 will be described. FIG. 3 is a block diagram illustrating the hardware configuration of the chatbot server 30.

As illustrated in FIG. 3, the chatbot server 30 includes a CPU 31, a ROM 32, a RAM 33, a storage 34, an input unit 35, a display unit 36, and a communication interface 37. These components are communicably connected to one another through a bus 39. The components of the chatbot server 30 have the same functions as those of the chat room server 20 illustrated in FIG. 2.

Figure 4:
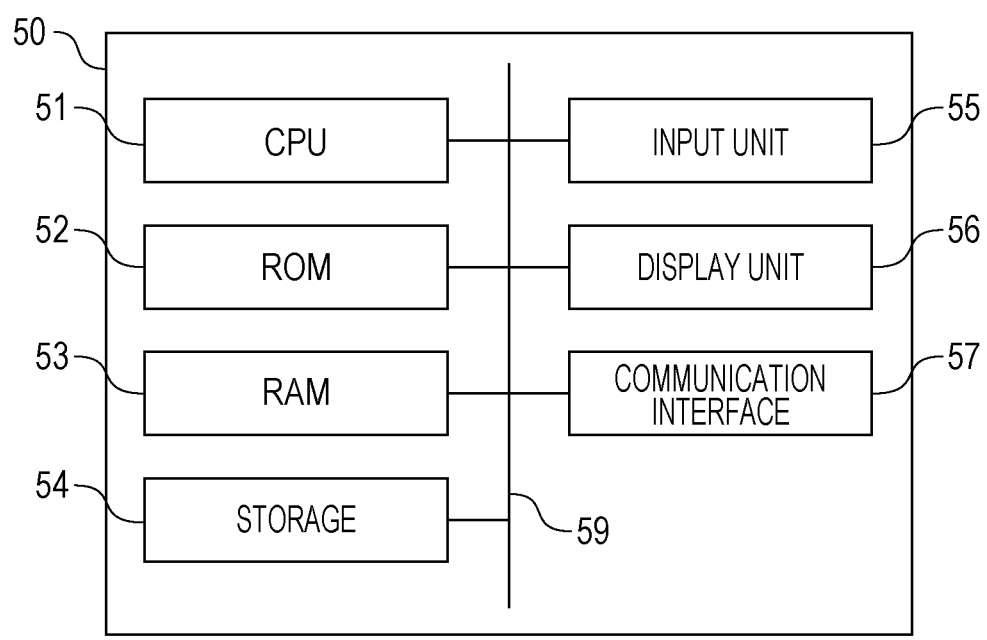
FIG. 4 is a block diagram illustrating the hardware configuration of a document server.

Next, the hardware configuration of the document server 50 will be described. FIG. 4 is a block diagram illustrating the hardware configuration of the document server 50.

As illustrated in FIG. 4, the document server 50 includes a CPU 51, a ROM 52, a RAM 53, a storage 54, an input unit 55, a display unit 56, and a communication interface 57. These components are communicably connected to one another through a bus 59. The components of the document server 50 have the same functions as those of the chat room server 20 illustrated in FIG. 2.

Next, the operation of the chat room server 20 will be described.

The CPU 21 executes a program stored in the ROM 22 or the storage 24 to open or manage a chat room.

The CPU 21 provides, as a service, a chat room in which plural users can participate and post messages. The chat room server 20 provides a chat room in which a single user and a single chatbot participate, a chat room in which plural users and a single chatbot participate, and the like. Plural chat rooms can be generated in accordance with requests to generate chat rooms from the users. Plural public chat rooms can be generated at the same site. A user who has participated in a chat room can invite another user who has not participated in the chat room to newly participate in the chat room.

The CPU 21 receives information input through user terminals 10 operated by users who have participated in a chat room provided thereby and posts the input information in the chat room. The information posted in the chat room is displayed on the user terminals 10 in predetermined order.

Next, the operation of the chatbot server 30 will be described. The chatbot server 30 performs a following operation when the CPU 31 has executed a program stored in the ROM 32 or the storage 34.

The CPU 31 registers a chat room that has been opened or a user who has participated in the chat room and an image forming apparatus 40 while associating the chat room or the user with the image forming apparatus 40. By registering an image forming apparatus 40 while associating the image forming apparatus 40 with a user, the image forming apparatus 40 becomes able to perform printing in accordance with a post written by the user in the chat room.

The CPU 31 generates or activates a chatbot by executing a program stored in the ROM 32 or the storage 34 and participates in a chat room as the chatbot. The CPU 31 controls, through the generated chatbot, conversations with users who have participated in a chat room. The CPU 31 also controls execution of processing such as printing and editing in accordance with posts written by the users and posts results of the execution in the chat room.

If the CPU 31 receives, in a chat room, an instruction to cause the image forming apparatus 40 to perform printing, or if a user posts an instruction message regarding the instruction in the chat room, for example, the CPU 31 causes the one of image forming apparatuses 40 associated with users who have participated in the chat room to perform printing. Table 1 is an example of a chat room list, which indicates correspondences between chat rooms and image forming apparatuses, stored in the storage 34. Table 2 is an example of a user list, which indicates correspondences between users, chat rooms in which the users have participated, and image forming apparatuses associated with the users, stored in the storage 34. The user list is an example of a list in the present disclosure. Addition to the user list need not be performed at a timing of posting corresponding to printing.

TABLE 1

| Chat room   | Type    | Apparatus                  |
|-------------|---------|----------------------------|
| Chat room 1 | Private | Image forming apparatus 40A |
| Chat room 2 | Private | Image forming apparatus 40B |
| Chat room 3 | Public  | Image forming apparatus 40D |

TABLE 2

| User   | Chat room   | Apparatus                  |
|--------|-------------|----------------------------|
| User A | Chat room 1 | Image forming apparatus 40A |
| User B | Chat room 2 | Image forming apparatus 40B |
| User C | Chat room 2 | Image forming apparatus 40C |
| User D | Chat room 3 | Image forming apparatus 40D |

The CPU 31 executes a program stored in the ROM 32 or the storage 34 to perform control for a user who has participated in a chat room.

When a user has participated in a private chat room, for example, the CPU 31 causes an image forming apparatus 40 associated with the private chat room or an image forming apparatus 40 associated with an existing user who has already participated in the private chat room to perform a process according to a post written by the user as an image forming apparatus 40 to perform a process in accordance with a post written by the user. The process can be, for example, a printing process, a process for reading a document, a process for transmitting a document, or the like.

When a user has participated in a public chat room, on the other hand, the CPU 31 causes an image forming apparatus 40 associated with the public chat room or an image forming apparatus 40 associated with an existing user who has already participated in the public chat room not to perform a printing process according to a post written by the user as an image forming apparatus 40 to perform a process in accordance with a post written by the user.

By changing a type of operation in accordance with characteristics of a private chat room in which a user has participated, the CPU 31 can enable the user to more easily use, than when the user makes settings himself/herself, an image forming apparatus available in the private chat room. In addition, by changing a type of operation in accordance with characteristics of a public chat room in which a user has participated, the CPU 31 can automatically prohibit the user from using an image forming apparatus available in the public chat room.

Here, an example of the operation of the chatbot server 30 will be described along with a use case according to the present exemplary embodiment.

Figure 5:
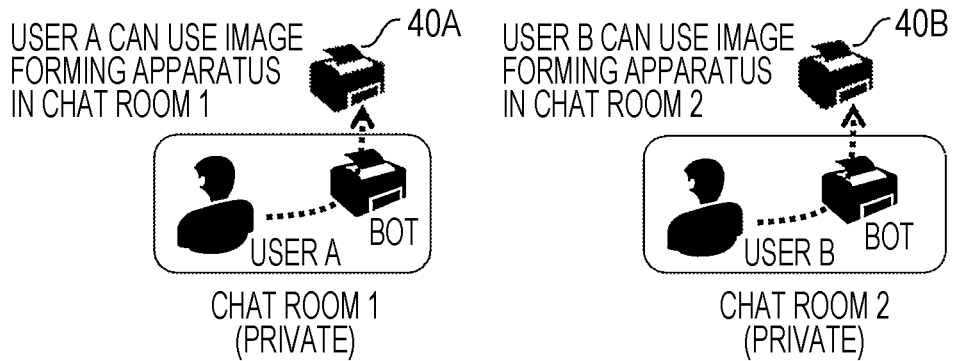
FIG. 5 is a diagram illustrating an example of a use case according to the exemplary embodiment.

FIG. 5 is a diagram illustrating an example of the use case according to the present exemplary embodiment. In the example illustrated in FIG. 5, both chat rooms 1 and 2 are private chat rooms. It is assumed that chat room 1 has been opened for a Tokyo site, and chat room 2 has been opened for an Osaka site. In chat room 1, the user A is associated with the image forming apparatus 40A. In chat room 2, the user B is associated with the image forming apparatus 40B.

The user A can post a printing instruction in chat room 1 to cause the image forming apparatus 40A to perform a printing process. Similarly, the user B can post a printing instruction in chat room 2 to cause the image forming apparatus 40B to perform a printing process. Although the image forming apparatuses 40A and 40B are associated with the users A and B, respectively, the image forming apparatuses 40A and 40B may be associated with chat rooms 1 and 2, respectively, instead of the users A and B. In the following description, too, image forming apparatuses may be associated with users or chat rooms.

If the user A newly participates in chat room 2 in this use case, the chatbot server 30 automatically enables the user A to use the image forming apparatus 40B available in chat room 2. When a user "newly" participates in a chat room, the user participates in a chat room for which the user has no history of participation. More specifically, when the user A has participated in chat room 2, the chatbot server 30 adds registration information regarding the image forming apparatus 40B to settings of the user A so that the user A can use the image forming apparatus 40B available in chat room 2. The registration information includes, for example, printing settings. The printing settings can include printing side (single-sided or double-sided), printing direction (vertical or horizontal), print sheet size, and color mode (black-and-white or color). Table 3 is an example of a list stored in the storage 34 when the user A has participated in chat room 2. When the user A has participated in chat room 2, the CPU 31 adds information regarding chat room 2 to the user list as indicated in Table 3 so that the user A can use the image forming apparatus 40B in chat room 2.

TABLE 3

| User | Chat room | Apparatus |
| --- | --- | --- |
| User A | Chat room 1 | Image forming apparatus 40A |
|  | Chat room 2 | Image forming apparatus 40B |
| User B | Chat room 2 | Image forming apparatus 40B |

Figure 6:
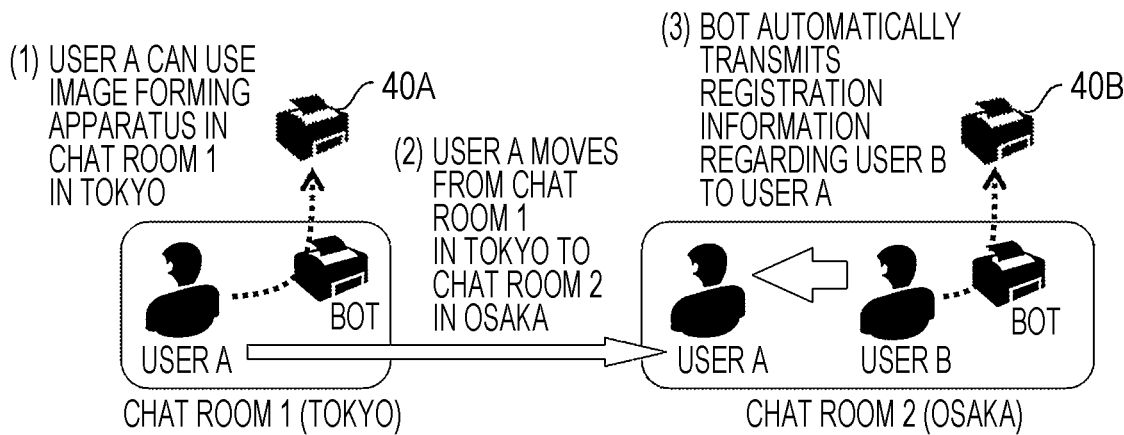
FIG. 6 is a diagram illustrating an outline of an operation performed by the chatbot server.

FIG. 6 is a diagram illustrating an outline of an operation performed by the chatbot server 30 when the user A has participated in chat room 2. By posting a printing instruction in chat room 2, the user A can cause the image forming apparatus 40B, which is associated with the user B, who is an existing user who has already participated in chat room 2, to perform a printing process on the basis of the settings on Table 3, without making settings for using the image forming apparatus 40B.

The image forming apparatuses 40A and 40B are associated with the user A on Table 3. Here, in order to cause only one of the image forming apparatuses 40A and 40B to perform printing as a result of an instruction corresponding to printing posted by the user A in either chat room 1 or chat room 2, the CPU 31 identifies a chat room likely to be used by the user A. The CPU 31 identifies such a chat room on the basis of a user's posting histories in the chat rooms. The CPU 31 may also use the user B's posting histories as well as the user A's posting histories, or may use information that can be obtained from the chat rooms. A chat room likely to be used by a user is, for example, a chat room that is being used by the user. Before the user A writes, in a chat room, a post that is an instruction corresponding to printing, for example, the CPU 31 analyzes posts written in the plural chat rooms in which the user A has participated and identifies a chat room that is being used by the user A. When it is difficult to identify the chat room that is being used by the user A, the CPU 31 may determine the chat room likely to be used by the user A on the basis of the user A's post that is an instruction corresponding to printing. In addition, even when it is possible to identify a chat room that is being used by the user A, the CPU 31 may change a result of the identification in accordance with a post written by the user A corresponding to printing. If a chat room in which the user A has posted a printing instruction such as "Print" is chat room 2, the CPU 31 determines that a currently active chat room is chat room 2, and causes the image forming apparatus 40B to perform a printing process. If the user A posts a printing instruction such as "Print in chat room 1" in chat room 2, on the other hand, the CPU 31 determines that a currently active chat room is chat room 1, and causes the image forming apparatus 40A to perform a printing process. As a result, the chatbot server 30 can prevent occurrence of an unnecessary printing process in accordance with a post written by a user.

When the user A has participated in a public chat room, on the other hand, the chatbot server 30 automatically prohibits the user A from using the image forming apparatus 40B available in the public chat room. That is, when the user A has participated in a public chat room, the chatbot server 30 does not add, to the user list, the information regarding the image forming apparatus 40B available in the public chat room.

Figure 7:
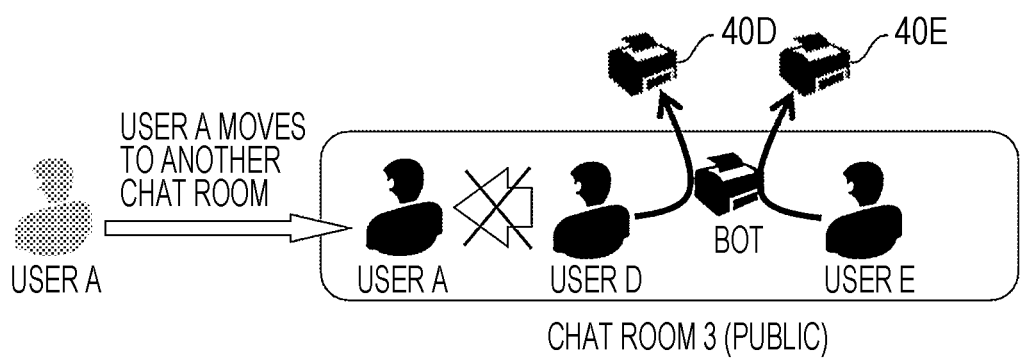
FIG. 7 is a diagram illustrating an outline of another operation performed by the chatbot server.

FIG. 7 is a diagram illustrating an outline of an operation performed by the chatbot server 30 when the user A has participated in chat room 3. In chat room 3, the user D is associated with an image forming apparatus 40D, and a user E is associated with an image forming apparatus 40E. The chatbot server 30 does not add registration information regarding the image forming apparatuses 40D and 40E to the user list when the user A has participated in chat room 3. It is needless to say that, if the user A manually makes settings for using the image forming apparatuses 40D and 40E, the user A can use the image forming apparatuses 40D and 40E in chat room 3.

If, after a user participates in a public chat room, there is an image forming apparatus associated with the public chat room, the chatbot server 30 may make settings such that the user can use only information regarding the image forming apparatus. In this case, the chatbot server 30 may make settings such that the user can use only the information regarding the information but is prohibited from using image forming apparatuses used by other users who have already participated in the public chat room. Alternatively, when a user has participated in a public chat room, the chatbot server 30 may set, for the user, only registration information regarding image forming apparatuses associated with some of users who have already participated in the public chat room.

Figure 8:
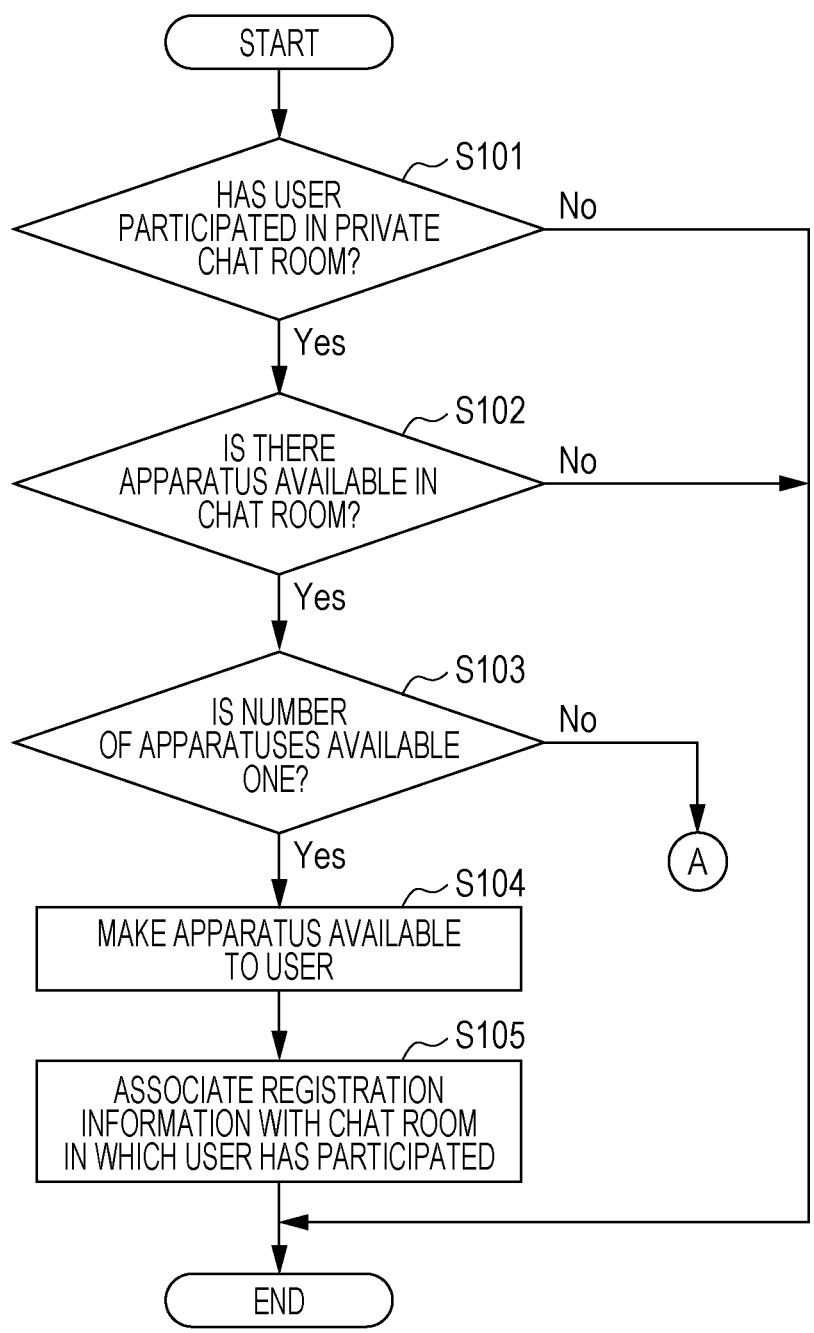
FIG. 8 is a flowchart illustrating an example of the operation of the chatbot server.

FIG. 8 is a flowchart illustrating an example of the operation of the chatbot server 30. FIG. 8 illustrates an example of an operation performed by the chatbot server 30 when a user has participated in a chat room.

The CPU 31 determines whether a user has participated in a private chat room (step S101). If determining in step S101 that a user has participated in a private chat room (YES in step S101), the CPU 31 then determines whether there is an image forming apparatus available in the private chat room (step S102).

If determining in step S102 that there is an image forming apparatus available in the private chat room (YES in step S102), the CPU 31 then determines whether the number of image forming apparatuses available in the private chat room is one (step S103). If determining in step S103 that the number of image forming apparatuses available in the private chat room is one (YES in step S103), the CPU 31 adds the image forming apparatus to the user list such that the user can use the image forming apparatus (step S104). A process to be performed when there are plural image forming apparatuses available (NO in step S103) will be described later with reference to FIG. 12.

After step S104, the CPU 31 associates registration information regarding the image forming apparatus with the chat room on the user list (step S105). As a result of step S105, the CPU 31 becomes able to, when the user has participated in a new chat room, automatically change settings in such a way as to cause an image forming apparatus available in the new chat room to perform printing without making the user aware of a difference in the chat room.

If determining in step S101 that user has participated in a public chat room (NO in step S101), or if determining in step S102 that there is no image forming apparatus available in the chat room (NO in step S102), the CPU 31 ends the operation.

Figure 9:
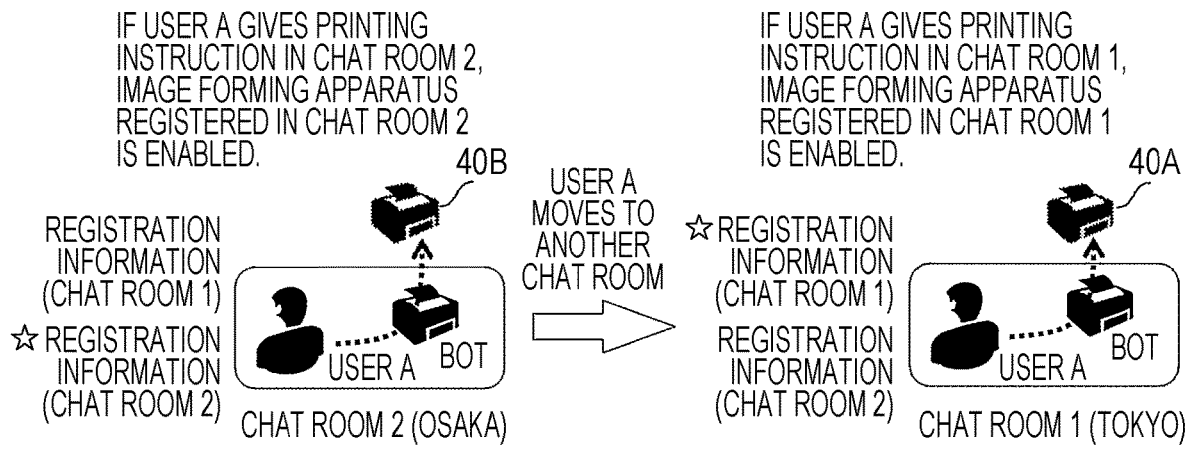
FIG. 9 is a diagram illustrating switching of an image forming apparatus at a time when a user has changed chat rooms.

FIG. 9 is a diagram illustrating switching of an image forming apparatus at a time when a user has changed chat rooms. When the user A has participated in chat room 2, the chatbot server 30 enables the image forming apparatus 40B, which is available to the user A in chat room 2. If the user A participates chat room 1 thereafter, the chatbot server 30 enables the image forming apparatus 40A, which is available to the user A in chat room 1. An "enabled image forming apparatus" refers to an image forming apparatus to be used for a printing process in default settings made by a user insofar as the user changes the default settings. Since the chatbot server 30 automatically switches an enabled image forming apparatus 40 in accordance with participation of a user in a chat room, the user need not manually change settings each time the user has newly participated in a chat room. By automatically switching an enabled image forming apparatus 40 in accordance with participation of a user in a chat room using the chatbot server 30, therefore, the user's convenience improves compared to when the user needs to manually change settings each time the user has newly participated in a chat room.

When a user has participated in a private chat room, the CPU 31 may, if there is another private chat room opened for a site for which the private chat room has been opened, refer to the user's history of participation in the other private chat room. If, as a result of the reference, there is no such history, the CPU 31 may add information regarding an image forming apparatus to the user list so that the user can use the image forming apparatus in the private chat room. If, as a result of the reference, there is the user's history of participation in the other private chat room, the CPU 31 need not add information regarding an image forming apparatus to the user list so that the user can use the image forming apparatus in the private chat room. The CPU 31 can thus prevent information regarding an image forming apparatus from being automatically registered to the user list for a user who has participated in a private chat room if there is the user's history of participation in another private chat room opened for the same site as for the private chat room.

If there are plural private chat rooms, the CPU 31 may analyze a user's use histories of private chat rooms and identify a private chat room likely to be used by the user. The CPU 31 may identify a private chat room in which the user has written a last post as a private chat room likely to be used by the user.

The CPU 31 may identify an image forming apparatus associated with a private chat room likely to be used by the user or an existing user who has already participated in the private chat room, instead. The CPU 31 may then determine, among image forming apparatuses added to the user list, the identified image forming apparatus as an image forming apparatus likely to be used by the user and cause the image forming apparatus to perform a process according to a post written by the user for the private chat room.

The CPU 31 may analyze the user's use histories of private chat rooms and identify an image forming apparatus associated with a private chat room determined to be unlikely to be used by the user or an existing user who has already participated in the private chat room. The CPU 31 may cause the image forming apparatuses associated with the private chat room determined, as a result of the analysis of the user's use histories of the private chat rooms, to be unlikely to be used by the user not to perform a process according to a post written by the user in the private chat room. As a result, the chatbot server 30 can prevent image forming apparatuses unlikely to be used by the user from performing a process according to a post. An example of private chat rooms determined to be unlikely to be used by the user is private chat rooms in which the user has never written a post. Even when there is the user's posting history, a private chat room may be determined to be unlikely to be used by the user if a certain period of time has elapsed since a last post written by the user. When the user A writes a post every day in a private chat room at a Tokyo office but has not written a post in a private chat room at an Osaka office for five years, for example, the private chat room at the Osaka office can be determined to be unlikely to be used by the user. The CPU 31 may then exclude image forming apparatuses determined, as a result of the analysis of the user's use histories of the private chat rooms, to be unlikely to be used by the user from processing targets or remove information regarding the image forming apparatus from the user list. The CPU 31, however, may cause an image forming apparatus determined to be unlikely to be used by the user to perform a process according to a post if the post specifies an image forming apparatus associated with a private chat room or an existing user who has already participated in the private chat room.

The CPU 31 may identify an image forming apparatus associated with a chat room that has been added to the user list a certain period of time or more before as an image forming apparatus unlikely to be used by the user. The CPU 31 can exclude an image forming apparatus associated with a chat room that has not been used for a certain period of time from processing targets or remove information regarding the image forming apparatus from the user list. In addition, the CPU 31 may identify an image forming apparatus associated with a private chat room that the user has left or a user who has already participated in the private chat room as an image forming apparatus unlikely to be used by the user. The CPU 31 can exclude an image forming apparatus associated with a chat room in which the user has not participated or an existing user who has already participated in the chat room from processing targets or remove information regarding the image forming apparatus from the user list.

The CPU 31 may then perform control such that an identified image forming apparatus unlikely to be used by the user is not selected from the user list. Alternatively, the CPU 31 may remove the identified image forming apparatus unlikely to be used by the user from the user list.

Figure 10:
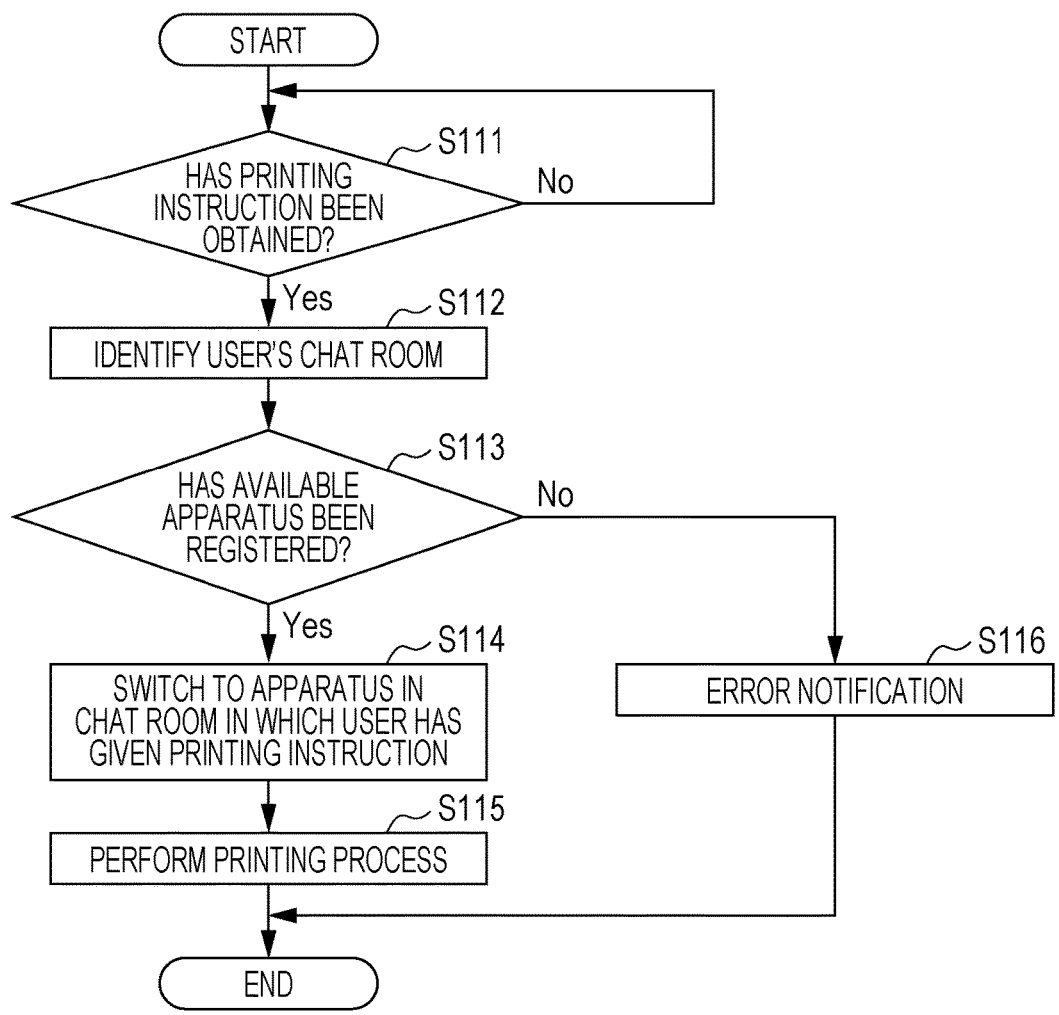
FIG. 10 is a flowchart illustrating another example of the operation of the chatbot server.

FIG. 10 is a flowchart illustrating another example of the operation of the chatbot server 30. FIG. 10 illustrates an example of an operation performed by the chatbot server 30 when the user posts a printing instruction in a chat room.

The CPU 31 waits until a printing instruction based on a post written by the user in a chat room is obtained (step S111). More specifically, the CPU 31 waits until the user posts a text message, "Print this", or image information indicating a printing instruction in the chat room along with a file to be printed. Upon obtaining a printing instruction (YES in step S111), the CPU 31 identifies the chat room in which the user who has given the printing instruction has participated (step S112). After step S112, the CPU 31 determines whether an image forming apparatus available to the user who has given the printing instruction has been registered in the chat room identified in step S112 (step S113).

If determining in step S113 that an image forming apparatus available to the user who has given the printing instruction has been registered in the chat room identified in step S112 (YES in step S113), the CPU 31 switches to the image forming apparatus in the chat room in which the user has given the printing instruction (step S114). After step S114, the CPU 31 causes the image forming apparatus to perform a printing process based on the printing instruction (step S115).

If determining in step S113 that an image forming apparatus available to the user who has given the printing instruction has not been registered in the chat room identified in step S112 (NO in step S113), on the other hand, the CPU 31 transmits an error notification to the chat room (step S116). The CPU 31 transmits the error notification by, for example, causing a chatbot to post a text message such as "No available printer has been set for this chat room".

A case where the number of image forming apparatuses available in a private chat room in which the user has participated is one has been described. Next, a case where there are plural image forming apparatuses available in a private chat room in which the user has participated will be described.

Figure 11:
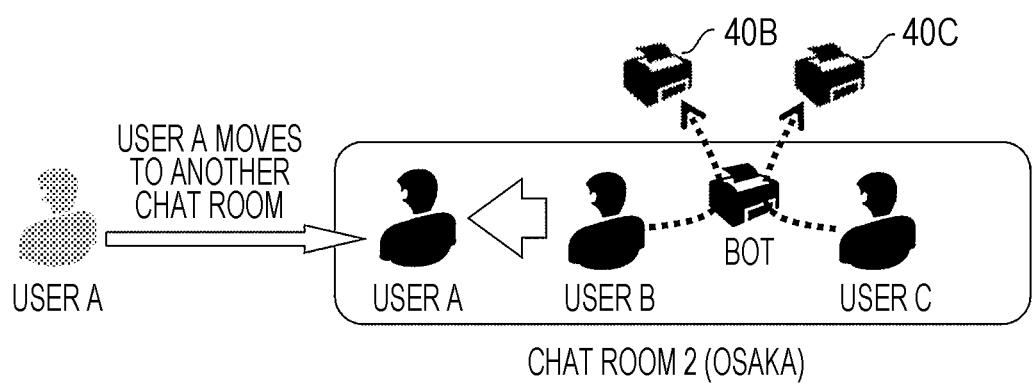
FIG. 11 is a diagram illustrating an outline of another operation performed by the chatbot server.

FIG. 11 is a diagram illustrating an outline of another operation performed by the chatbot server 30 when the user A has participated in chat room 2. Chat room 2 is a private chat room opened for the Osaka site. In FIG. 11, the users B and C have already participated in chat room 2. The user B is associated with the image forming apparatus 40B, and the user C is associated with an image forming apparatus 40C. In this case, the chatbot server 30 may make both the image forming apparatuses 40B and 40C available to the user A.

Figure 12:
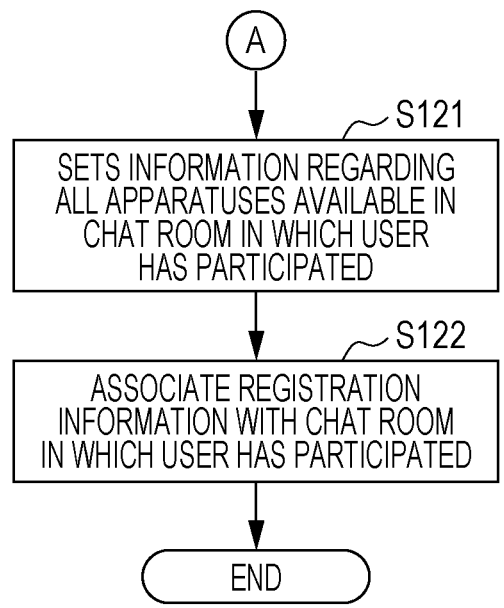
FIG. 12 is a flowchart illustrating another example of the operation of the chatbot server.

FIG. 12 is a flowchart illustrating another example of the operation of the chatbot server 30. FIG. 12 illustrates an example of an operation performed by the chatbot server 30 when there are plural image forming apparatus available in a private chat room in which the user has participated.

If determining in step S103 illustrated in FIG. 8 that there are plural image forming apparatuses available (NO in step S103), the CPU 31 sets, for the user who has participated in the chat room, information regarding all the image forming apparatuses available in the chat room (step S121). After step S121, the CPU 31 associates, on the user list, registration information regarding the image forming apparatuses and the chat room in which the user has participated with each other (step S122).

If the user posts a printing instruction in the chat room after the registration regarding all the image forming apparatuses available in the chat room in which the user has participated is set, the chatbot server 30 asks, in the chat room, the user to select an image forming apparatus to be used.

Figure 13:
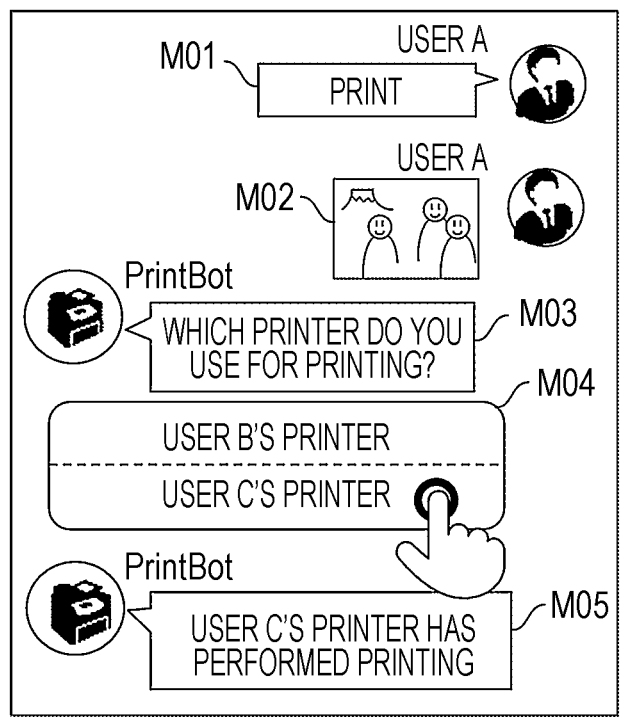
FIG. 13 is a diagram illustrating an example of a series of posts displayed in a chat room.
Figure 14:
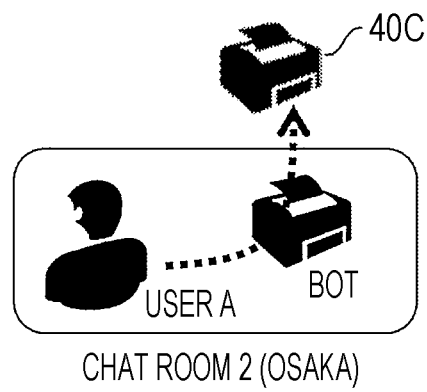
FIG. 14 is a diagram illustrating a printing process performed as a result of the series of posts written in the chat room illustrated in FIG. 13.

FIG. 13 is a diagram illustrating an example of a series of posts displayed in the chat room. FIG. 14 is a diagram illustrating a printing process performed as a result of the series of posts written in the chat room illustrated in FIG. 13. The user A posts, in the chat room, text information M01, "Print", and an image M02 to be printed. The chatbot (indicated by a user name "PrintBot" in FIG. 13) posts, in the chat room, a message M03 asking the user A about an image forming apparatus to perform the printing process, namely the image forming apparatus 40B associated with the user B or the image forming apparatus 40C associated with the user C, which are image forming apparatuses available to the user A. The chatbot also posts, in the chat room, information M04 indicating candidates for the image forming apparatus to perform a printing process. If the user A selects the image forming apparatus 40C associated with the user C in the information M04, the chatbot server 30 causes the image forming apparatus 40C to print the image M02 and posts, in the chat room, a message M05 indicating that the printing has been completed.

After the registration information regarding all the image forming apparatuses available in the private chat room in which the user has participated is set, the chatbot server 30 may add an enabled image forming apparatus to the user list so that the user can use the image forming apparatus. After the registration information regarding all the image forming apparatuses available in the private chat room in which the user has participated is set, for example, the chatbot server 30 may enable a frequently used image forming apparatus for the user as an effective image forming apparatus. Alternatively, for example, the chatbot server 30 may set, as a frequently used image forming apparatus, an image forming apparatus that has been used the most after the private chat room is opened. Alternatively, for example, the chatbot server 30 may set, as a frequently used image forming apparatus, an image forming apparatus that has been used the most in a certain past period of time. By enabling a frequently used image forming apparatus after the registration information regarding all the image forming apparatuses available in the private chat room in which the user has participated is set, the chatbot server 30 can automatically cause the enabled image forming apparatus to perform a printing process if the user posts a printing instruction in the chat room.

Figure 15:
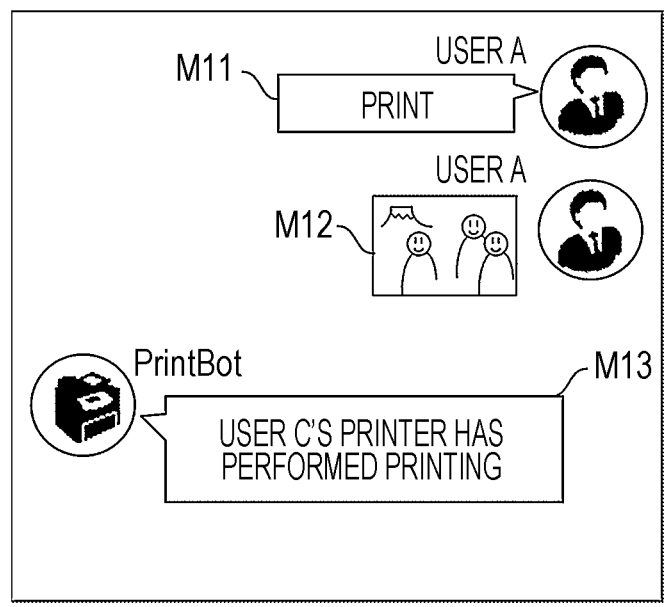
FIG. 15 is a diagram illustrating another example of the series of posts displayed in the chat room.
Figure 16:
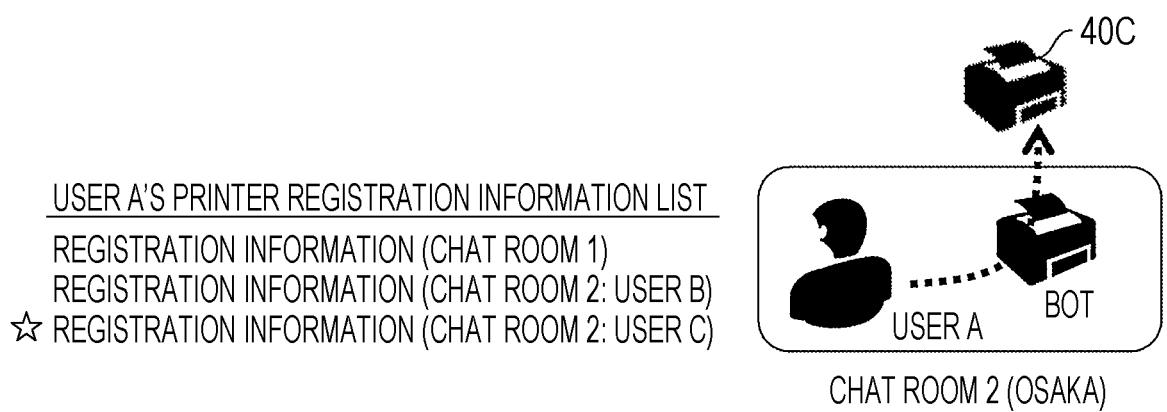
FIG. 16 is a diagram illustrating a printing process performed as a result of the series of posts written in the chat room illustrated in FIG. 15.

FIG. 15 is a diagram illustrating another example of the series of posts displayed in the chat room. FIG. 16 is a diagram illustrating a printing process performed as a result of the series of posts written in the chat room illustrated in FIG. 15. Here, the chatbot server 30 has set the frequently used image forming apparatus 40C for the user A as an effective image forming apparatus. The user A posts, in the chat room, text information M11, "Print", and an image M12 to be printed. The chatbot (indicated by a user name "PrintBot" in FIG. 15) posts, in the chat room, a message M13 indicating that the image forming apparatus 40C has finished printing the image M12.

Figure 17:
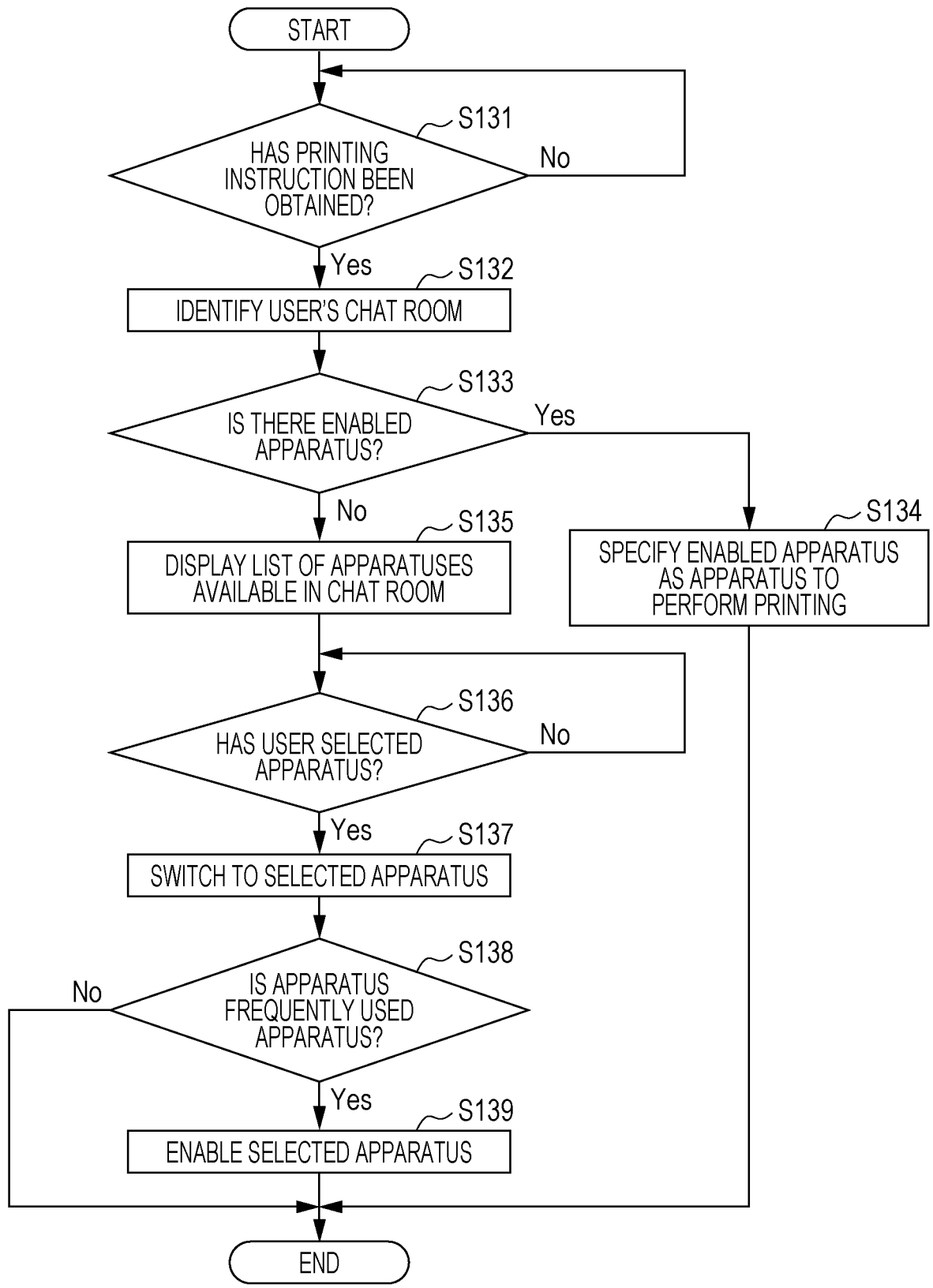
FIG. 17 is a flowchart illustrating another example of the operation of the chatbot server.

FIG. 17 is a flowchart illustrating another example of the operation of the chatbot server 30. FIG. 17 illustrates an example of an operation performed by the chatbot server 30 when the user has posted a printing instruction in the chat room.

The CPU 31 waits for a printing instruction based on a post written by the user in a chat room (step S131). Upon obtaining a printing instruction (YES in step S131), the CPU 31 identifies the chat room in which the user who has given the printing instruction has participated (step S132). After step S132, the CPU 31 determines whether there is an enabled image forming apparatus in the chat room identified in step S132 (step S133).

If determining in step S133 that there is an enabled image forming apparatus in the chat room identified in step S132 (YES in step S133), the CPU 31 specifies the enabled image forming apparatus as an image forming apparatus to perform a printing process according to the printing instruction obtained in step S131 (step S134).

If determining in step S133 that there is no enabled image forming apparatus in the chat room identified in step S132 (NO in step S133), on the other hand, the CPU 31 displays a list of image forming apparatuses available in the chat room identified in step S132 (step S135). The list of image forming apparatus is, for example, the information M04, which indicates candidates for the image forming apparatus to perform a printing process illustrated in FIG. 13.

The CPU 31 waits until the user selects the image forming apparatus to perform the printing process from the list (step S136). If the user selects the image forming apparatus to perform the printing process (YES in step S136), the CPU 31 determines the image forming apparatus selected by the user as an image forming apparatus to be used by the user in the chat room (step S137).

After step S137, the CPU 31 determines whether the image forming apparatus to be used by the user is an image forming apparatus frequently used in the chat room (step S138). If determining that the image forming apparatus to be used by the user is an image forming apparatus frequently used in the chat room (YES in step S138), the CPU 31 enables the image forming apparatus selected in step S137 as the image forming apparatus to be used by the user (step S139). If determining that the image forming apparatus to be used by the user is not an image forming apparatus frequently used in the chat room (NO in step S138), the CPU 31 skips step S139.

By performing the operation illustrated in FIG. 17, the chatbot server 30 can make an image forming apparatus frequently used in a chat room available to a user who has participated in the chat room as an effective image forming apparatus. By performing the operation illustrated in FIG. 17, the chatbot server 30 further improves the user's convenience compared to when registration information regarding all image forming apparatuses is set, since the user need not select an image forming apparatus.

If there are plural image forming apparatus available in a private chat room in which a user has participated, the chatbot server 30 may select an effective image forming apparatus on the basis of conversations held in the private chat room and make the selected image forming apparatus available to the user.

Figure 18:
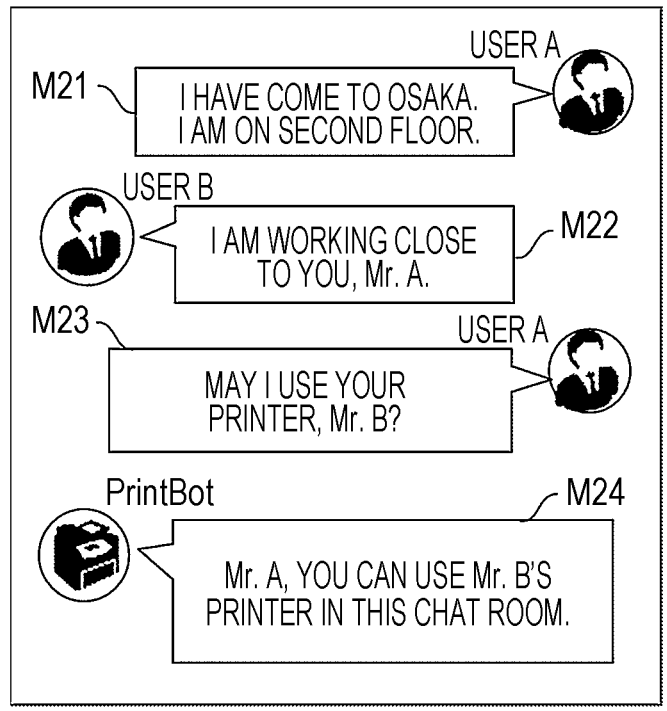
FIG. 18 is a diagram illustrating another example of the series of posts displayed in the chat room.

FIG. 18 is a diagram illustrating an example of the series of posts displayed in the chat room. FIG. 18 illustrates an example of conversations held when the user A has participated in chat room 2.

After participating in chat room 2, the user A has posted, in chat room 2, information M21 indicating that he/she is on a second floor of the Osaka site. The user B at the Osaka site has then posted information M22 indicating that he/she is working close to the user A. The user A has read the information M22 and posted information M23 indicating that he/she desires to use an image forming apparatus 40 associated with the user B since the user B is working close to the user A. In accordance with this series of conversations, the chatbot server 30 adds the image forming apparatus 40 associated with the user B to the user list so that the user A can use the image forming apparatus 40 and posts information M24 indicating that the user A can use the image forming apparatus 40 associated with the user B.

Figure 19:
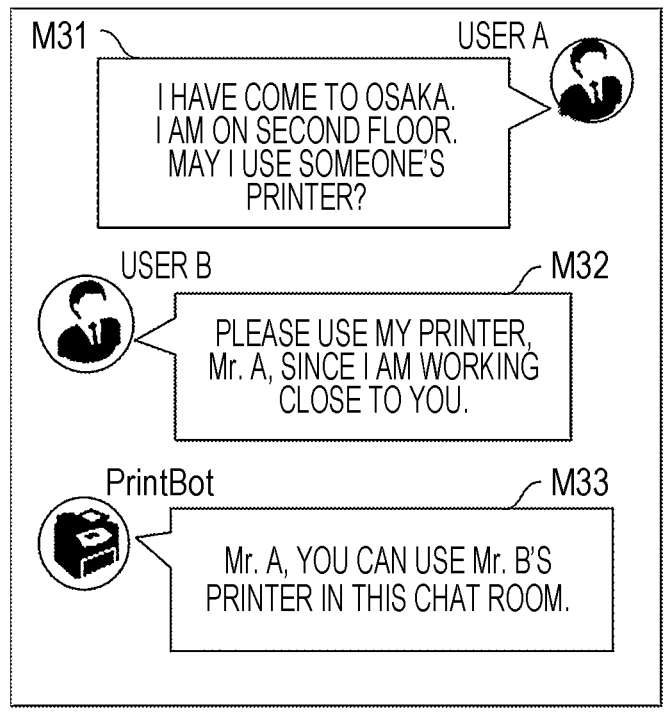
FIG. 19 is a diagram illustrating another example of the series of posts displayed in the chat room.

FIG. 19 is a diagram illustrating another example of the series of posts displayed in the chat room. FIG. 19 illustrates an example of the conversations held when the user A has participated in chat room 2.

After participating in chat room 2, the user A has posted, in chat room 2, information M31 indicating the he/she is on the second floor of the Osaka site and desires to use an image forming apparatus associated with someone. The user B at the Osaka site has posted information M32 indicating that the user A may use the image forming apparatus 40 associated with the user B since the user B is working close to the user A. In accordance with this series of conversations, the chatbot server 30 makes the image forming apparatus 40 associated with the user B available to the user A and posts information M33 indicating that the image forming apparatus 40 associated with the user B is available to the user A.

Figure 20:
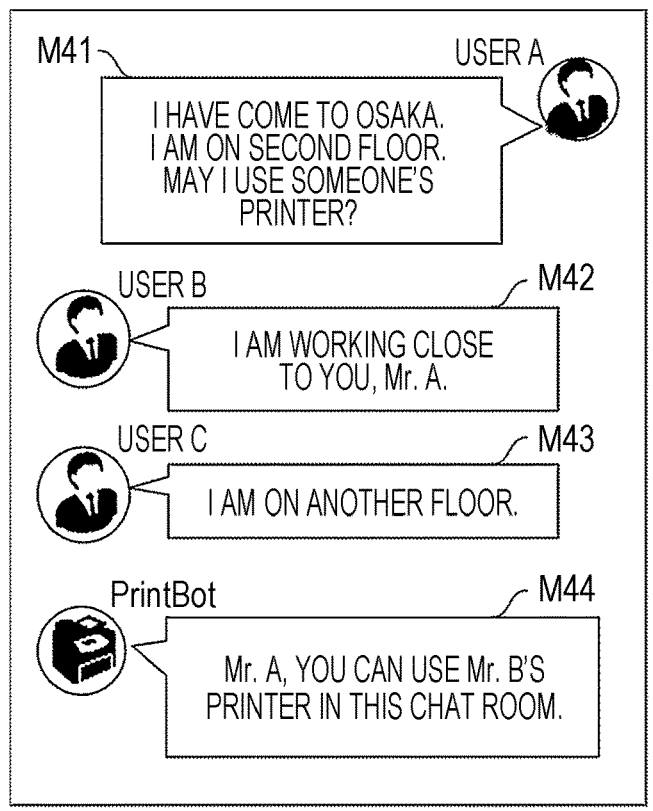
FIG. 20 is a diagram illustrating another example of the series of posts displayed in the chat room.

FIG. 20 is a diagram illustrating another example of the series of posts displayed in the chat room. FIG. 20 illustrates an example of the conversations held when the user A has participated in chat room 2.

After participating in chat room 2, the user A has posted, in chat room 2, information M41 indicating that he/she is on the second floor of the Osaka site and desires to use an image forming apparatus associated with someone. The user B at the Osaka site has read the information M41 and posted information M42 indicating that he/she is working close to the user A. The user C at the Osaka site has also read the information M41 and posted information M43 indicating that he/she is working on a floor different from that on which the user A is. In accordance with this series of conversations, the chatbot server 30 makes the image forming apparatus 40 associated with the user B available to the user A and posts information M44 indicating that the image forming apparatus 40 associated with the user B is available to the user A.

The chatbot server 30 may select an image forming apparatus available to a user who has participated in a chat room in accordance with posts other than the series of posts illustrated in FIGS. 18 to 20. The chatbot server 30 may keep checking posts written in a chat room until the chatbot server 30 can identify an image forming apparatus selected.

Figure 21:
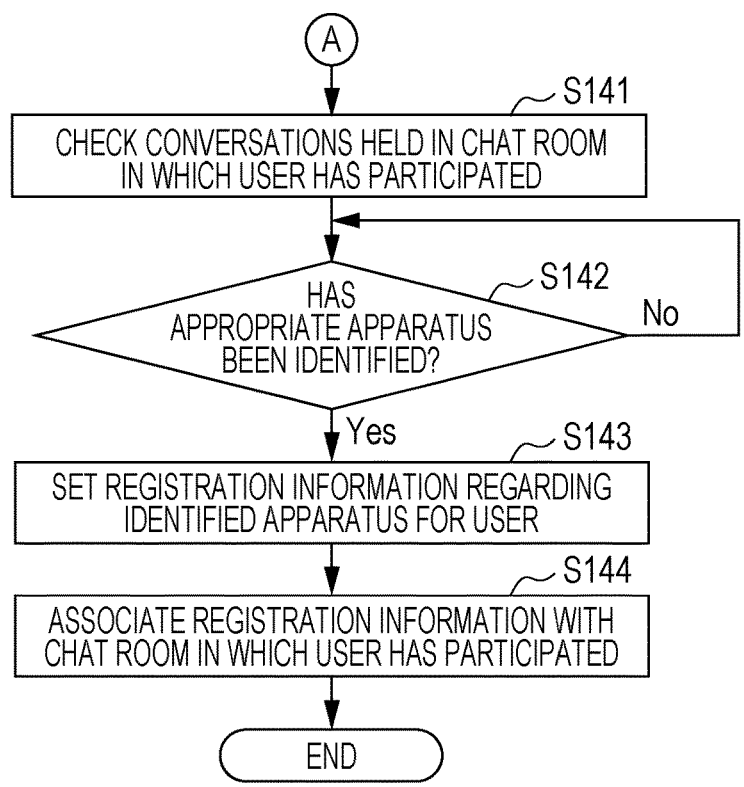
FIG. 21 is a flowchart illustrating another example of the operation of the chatbot server.

FIG. 21 is a flowchart illustrating an example of the operation of the chatbot server 30. FIG. 21 illustrates an example of the operation performed by the chatbot server 30 when there are plural image forming apparatuses available in the chat room in which the user has participated.

If determining in step S103 illustrated in FIG. 8 that there are plural image forming apparatuses available (NO in step S103), the CPU 31 checks conversations held in the chat room in which the user has participated (step S141). After step S141, the CPU 31 determines, as a result of the checking of the conversations, whether an appropriate image forming apparatus has been identified (step S142).

If determining in step S142 that an appropriate image forming apparatus has not been identified (NO in step S142), the CPU 31 returns to step S141. If determining in step S142 that an appropriate image forming apparatus has been identified (YES in step S142), the CPU 31 sets, on the user list, registration information regarding the identified image forming apparatus for the user who has participated in the chat room (step S143). After step S143, the CPU 31 associates, on the user list, the registration information regarding the image forming apparatus and the chat room in which the user has participated with each other (step S144).

By performing the operation illustrated in FIG. 21, the CPU 31 can select, using conversations held in a chat room, an effective image forming apparatus for a user who has participated in the chat room. By performing the operation illustrated in FIG. 21, the chatbot server 30 further improves the user's convenience compared to when registration information regarding all image forming apparatuses is set, since the user need not select an image forming apparatus.

If there are plural image forming apparatuses in a chat room in which a user has participated and plural image forming apparatuses are associated with an existing user who has already participated in the chat room, the CPU 31 may add only information regarding a disabled image forming apparatus to the user list. In addition, if there are plural image forming apparatuses available in a chat room in which a user has participated and plural image forming apparatuses are associated with an existing user who has already participated in the chat room, the CPU 31 need not add information regarding a disabled image forming apparatus to the user list. A disabled image forming apparatus is, for example, an image forming apparatus that has stopped working or an image forming apparatus that does not execute a function thereof because appropriate settings have not been made.

The CPU 31 may determine whether an image forming apparatus is an enabled image forming apparatus on the basis of whether an existing user has enabled the image forming apparatus. In this case, the CPU 31 may determine an image forming apparatus that has not been enabled by an existing user as a disabled image forming apparatus. In addition, the CPU 31 may determine an image forming apparatus likely to be used by the user as an enabled image forming apparatus.

Figure 22:
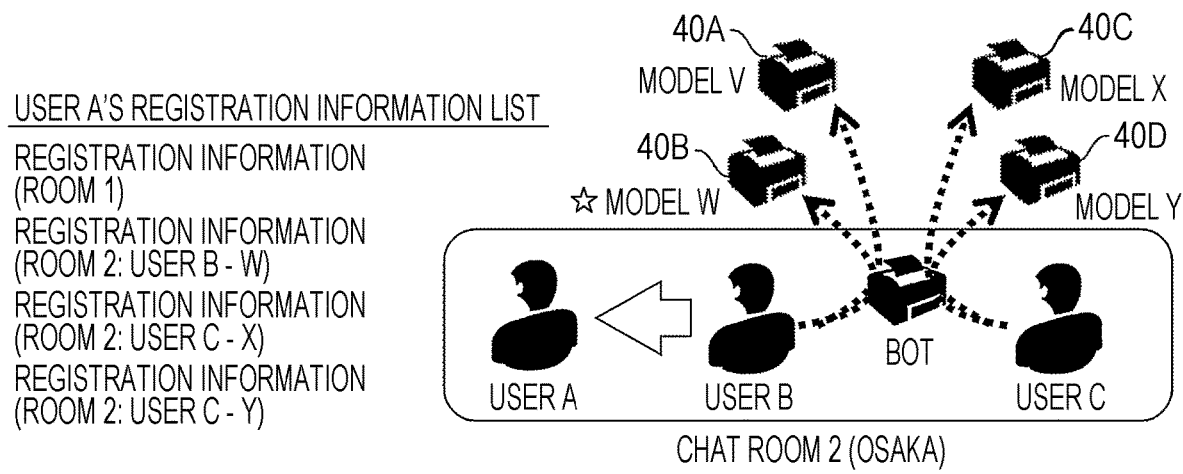
FIG. 22 is a diagram illustrating an outline of another operation performed by the chatbot server.

FIG. 22 is a diagram illustrating an outline of another operation performed by the chatbot server 30 when the user A has participated in chat room 2. FIG. 22 illustrates a case where the users B and C have already participated in chat room 2 and are associated with the image forming apparatuses 40A and 40B and the image forming apparatuses 40C and 40D, respectively. The user B has enabled the image forming apparatus 40B.

In this case, the chatbot server 30 may add only the image forming apparatus 40B between the two image forming apparatuses 40A and 40B associated with the user B to the user list so that the user A can use the image forming apparatus 40B. The chatbot server 30 may also add the two image forming apparatuses 40C and 40D associated with the user C to the user list so that the user A can use the image forming apparatuses 40C and 40D. As a result, the chatbot server 30 makes the image forming apparatuses 40B, 40C, and 40D available to the user A in chat room 2.

Figure 23:
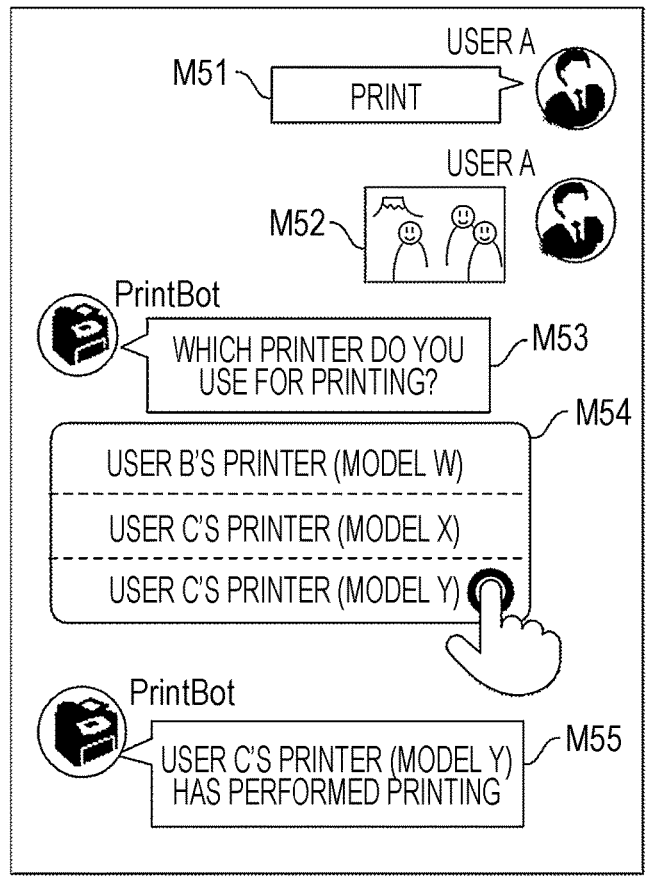
FIG. 23 is a diagram illustrating another example of the series of posts displayed in the chat room.

FIG. 23 is a diagram illustrating an example of the series of posts displayed in the chat room. FIG. 23 illustrates an example of the series of posts at a time when the chatbot server 30 has made the image forming apparatuses 40B, 40C, and 40D available to the user A in chat room 2 as illustrated in FIG. 22.

The user A posts, in the chat room, text information M51, "Print", and an image M52 to be printed. The chatbot (indicated by a user name "PrintBot" in FIG. 23) posts, in the chat room, a message M53 asking the user A about an image forming apparatus to perform the printing process, namely the image forming apparatus 40B associated with the user B or the image forming apparatus 40C or 40D associated with the user C, all of which have been added to the user list. The chatbot then posts, in the chat room, information M54 indicating candidates for the image forming apparatus to perform the printing process. If the user A selects the image forming apparatus 40C associated with the user C in the information M54, the chatbot server 30 causes the image forming apparatus 40C to print the image M52 and posts, in the chat room, a message M55 indicating that the printing has been completed.

Figure 24:
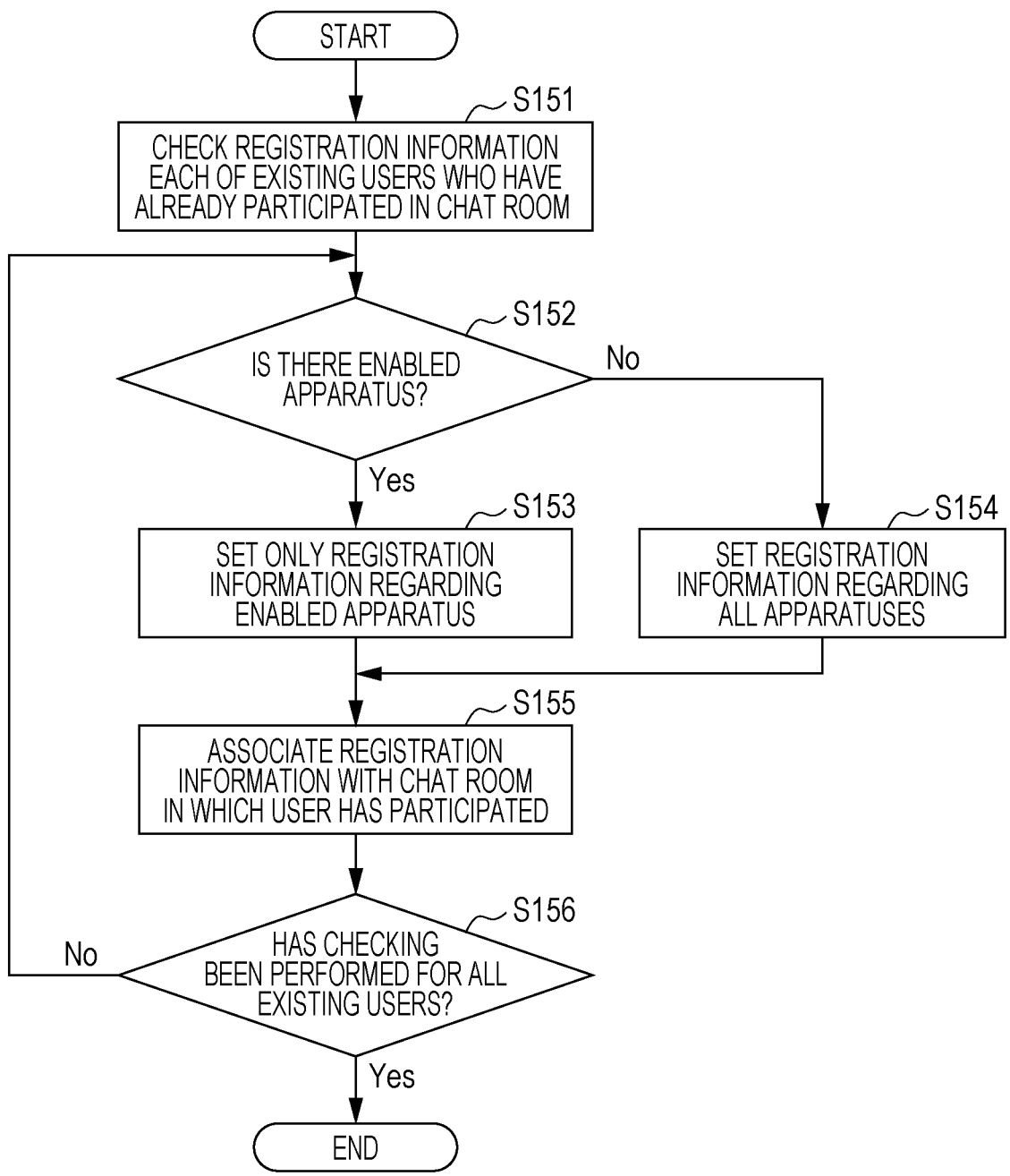
FIG. 24 is a flowchart illustrating another example of the operation of the chatbot server.

FIG. 24 is a flowchart illustrating an example of the operation of the chatbot server 30. FIG. 24 illustrates another example of the operation performed by the chatbot server 30 when there are plural image forming apparatuses available in the chat room in which the user has participated.

If determining in step S103 illustrated in FIG. 8 that there are plural image forming apparatuses available in the chat room in which the user has participated (NO in step S103), the CPU 31 checks registration information regarding the image forming apparatuses for each of existing users who have already participated in the chat room (step S151). After step S151, the CPU 31 determines whether there is an image forming apparatus enabled for the existing user in the chat room (step S152).

If determining in step S152 that there is an image forming apparatus enabled for the existing user in the chat room (YES in step S152), the CPU 31 sets only the registration information regarding the enabled image forming apparatus to the user list (step S153).

If determining in step S152 that there is no image forming apparatus enabled for the existing user in the chat room (NO in step S152), on the other hand, the CPU 31 sets registration information regarding all image forming apparatuses associated with the existing user to the user list (step S154).

After step S153 or S154, the CPU 31 associates, on the user list, the registration information regarding the image forming apparatus(es) and the chat room in which the user has participated with each other (step S155).

After step S155, the CPU 31 determines whether the checking has been performed for all the existing users in the chat room (step S156). If not (NO in step S156), the CPU 31 resumes the operation from step S152 for an existing user for whom the checking has not been performed. If the checking has been performed for all the existing users in the chat room (YES in step S156), on the other hand, the CPU 31 ends the operation.

By performing the operation illustrated in FIG. 24, the chatbot server 30 can narrow down image forming apparatuses to be made available to a user who has participated in a chat room.

If determining in step S152 that there is no image forming apparatus enabled for the existing user, the CPU 31 need not add registration information regarding all image forming apparatuses associated with the existing user to the user list, instead.

Although the chat room server 20, the chatbot server 30, and the document server 50 are separate apparatuses in the above exemplary embodiment, the configuration employed is not limited to this. For example, at least two of the functions of the chat room server 20, the chatbot server 30, and the document server 50 may be achieved by a single server. Alternatively, part of the functions of the chat room server 20, the chatbot server 30, and the document server 50 may be achieved by another server.

Although the control system 11 includes the chat room server 20 in the above exemplary embodiment, the present disclosure is not limited to this example. A service outside the control system 11 may provide chat rooms, instead. That is, the control system 11 may be a system that provides a chatbot that participates in external chat room services without providing chat rooms.

In addition, the processes performed by the chatbot server 30 according to the above exemplary embodiment may be performed by software, hardware, or a combination of software and hardware, instead. Alternatively, the processes performed by the chatbot server 30 may be stored in a storage medium as a program and distributed.

In addition, a program for operating the chatbot server 30 may be provided in a computer-readable medium such as a universal serial bus (USB) memory, a flexible disk, or a compact-disc read-only memory (CD-ROM) or may be provided online over a network such as the Internet. In this case, the program stored in the computer-readable medium is usually transferred to a memory, a storage, or the like and stored. Alternatively, for example, the program may be provided as an independent application software program or incorporated into software of the chatbot server 30 as a function of the chatbot server 30.

The operations performed by the CPUs in the above exemplary embodiment may be performed by a processor, instead. In the embodiment above, the term "processor" refers to hardware in a broad sense. Examples of the processor include general processors (e.g., CPU: Central Processing Unit), dedicated processors (e.g., GPU: Graphics Processing Unit, ASIC: Application-Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The present disclosure is not limited to the above description. The present disclosure may be modified in various ways without deviating from the scope thereof and implemented.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
cause, if a first user participates in a first chat room which has been opened for a specific site, an image forming apparatus associated with the first chat room or an image forming apparatus associated with a second user who has already participated in the first chat room to perform a process according to a first chat room post written by the first user; and
cause, if the first user participates in a second chat room which has not been opened for a specific site, an image forming apparatus associated with the second chat room or an image forming apparatus associated with a third user who has already participated in the second chat room not to perform a process according to a second chat room post written by the first user.

2. The information processing apparatus according to claim 1, wherein, if the first user newly participates in an other first chat room in which the first user does not have a history of participation, the processor causes an image forming apparatus associated with the other first chat room or an image forming apparatus associated with a fourth user who has already participated in the other first chat room to perform the process according to an other first chat room post written by the first user.

3. The information processing apparatus according to claim 2, wherein, if the image forming apparatus associated with the other first chat room or the image forming apparatus associated with the fourth user who has already participated in the other first chat room is enabled, the processor adds information regarding the image forming apparatus associated with the other first chat room or the image forming apparatus associated with the fourth user who has already participated in the other first chat room is enabled to a list of apparatuses available to the user in accordance with the participation of the first user in the other first chat room and, if the image forming apparatus associated with the other first chat room or the image forming apparatus associated with the fourth user who has already participated in the other first chat room is disabled, the processor does not add the information regarding the image forming apparatus associated with the other first chat room or the image forming apparatus associated with the fourth user who has already participated in the other first chat room is enabled to the list.

4. The information processing apparatus according to claim 3, wherein the processor determines an image forming apparatus likely to be used by the first user as an enabled image forming apparatus and determines whether an image forming apparatus is likely to be used by the first user on a basis of the first user's posting history in one or a plurality of first chat rooms and a state of an image forming apparatus used in the one or plurality of first chat rooms.

5. The information processing apparatus according to claim 3, wherein, if a plurality of image forming apparatuses are used in a single first chat room, the processor determines, on a basis of the first user's posting history in the single first chat room and states of the plurality of image forming apparatuses used in the single first chat room, which of the plurality of image forming apparatuses are enabled and presents an image forming apparatus determined to be enabled to the first user.

6. The information processing apparatus according to claim 1, wherein, if the first chat room is one of a plurality of first chat rooms, the processor analyzes the first user's use histories of the plurality of first chat rooms and causes an image forming apparatus associated with, among the plurality of first chat rooms, a first chat room determined to be likely to be used by the first user or an image forming apparatus used by the second user who has already participated in the first chat room likely to be used by the first user to perform the process according to the first chat room post written by the first user.

7. The information processing apparatus according to claim 6, wherein the processor analyzes use histories by the first user, determines, among the plurality of first chat rooms, a chat room in which the first user has written a last post as a chat room likely to be used by the first user, and causes an image forming apparatus associated with a fifth user who has already participated in the chat room to perform the process according to the first chat room post written by the first user.

8. The information processing apparatus according to claim 6, wherein the processor analyzes the first user's use histories of the plurality of first chat rooms and causes an image forming apparatus associated with, among the plurality of first chat rooms, an other first chat room determined to be unlikely to be used by the first user or an image forming apparatus associated with the second user who has already participated in the other first chat room not to perform the process according to the first chat room post written by the first user.

9. The information processing apparatus according to claim 1, wherein, if the first chat room is one of a plurality of first chat rooms, the processor analyzes the first user's use histories of the plurality of first chat rooms and causes an image forming apparatus associated with, among the plurality of first chat rooms, a first chat room determined to be unlikely to be used by the first user or an image forming apparatus associated with the second user who has already participated in the first chat room not to perform the process according to the first chat room post written by the first user.

10. The information processing apparatus according to claim 1, wherein, if the first user who has participated in the first chat room newly participates in an other first chat room in which the user does not have a history of participation, the processor adds information regarding an image forming apparatus associated with the other first chat room or an image forming apparatus associated with the fourth user who has already participated in the other first chat room to a list of apparatuses available to the first user and causes the image forming apparatus for which the information has been added to the list to perform a process according to an other first chat room post written by the first user.

11. The information processing apparatus according to claim 10, wherein the processor analyzes the first user's use history of the other first chat room and does not select, among image forming apparatuses for which information has been added to the list, an image forming apparatus associated with a chat room determined to be unlikely to be used by the user or an image forming apparatus associated with a sixth user who has already participated in the chat room, from the list of apparatuses.

12. The information processing apparatus according to claim 11, wherein the processor determines an image forming apparatus that has been added to the list a certain period of time before as an image forming apparatus unlikely to be used by the first user.

13. The information processing apparatus according to claim 11, wherein the processor determines, as an image forming apparatus unlikely to be used by the first user, an image forming apparatus associated with a chat room of the plurality of first chat rooms that the user has left or an image forming apparatus associated with the second user who is still participating in the chat room of the plurality of first chat rooms that the user has left.

14. The information processing apparatus according to claim 10, wherein the processor analyzes the first user's use history of the other first chat room and removes, among image forming apparatuses associated with chat rooms for which information has been added to the list or image forming apparatuses associated with existing sixth users who have already participated in the chat rooms, an image forming apparatus determined to be unlikely to be used by the first user from the list.

15. The information processing apparatus according to claim 14, wherein the processor determines an image forming apparatus that has been added to the list a certain period of time before as an image forming apparatus unlikely to be used by the first user.

16. The information processing apparatus according to claim 14, wherein, if the first user has the first user's history of participation in a yet other first chat room that has been opened for a site for which the yet other first chat room in which the first user newly participates has been opened, the processor does not add the information regarding the image forming apparatus associated with the yet other first chat room or the image forming apparatus associated with the fourth user who has already participated in the other first chat room to the list.

17. The information processing apparatus according to claim 10, wherein, if the first user does not have the first user's history of participation in a yet other first chat room that has been opened for a site for which the yet other first chat room in which the first user newly participates has been opened, the processor adds the information regarding the image forming apparatus associated with the yet other first chat room or the image forming apparatus associated with the fourth user who has already participated in the yet other first chat room to the list of apparatuses available to the first user in each of the first chat rooms.

18. A non-transitory computer readable medium storing a program causing a computer to execute a process comprising:
   causing, if a first user participates in a first chat room which has been opened for a specific site, an image forming apparatus associated with the first chat room or an image forming apparatus associated with a second user who has already participated in the first chat room to perform a process according to a first chat room post written by the first user; and
   causing, if the first user participates in a second chat room which has not been opened for a specific site, an image forming apparatus associated with the second chat room or an image forming apparatus associated with a third user who has already participated in the second chat room not to perform a process according to a second chat room post written by the first user.

* * * * *